Aug. 1, 1961  R. MONAGHAN ET AL  2,994,770
DECENTRALIZING SPRING MOUNTING FOR WELL LOGGING INSTRUMENTS
Filed July 11, 1956
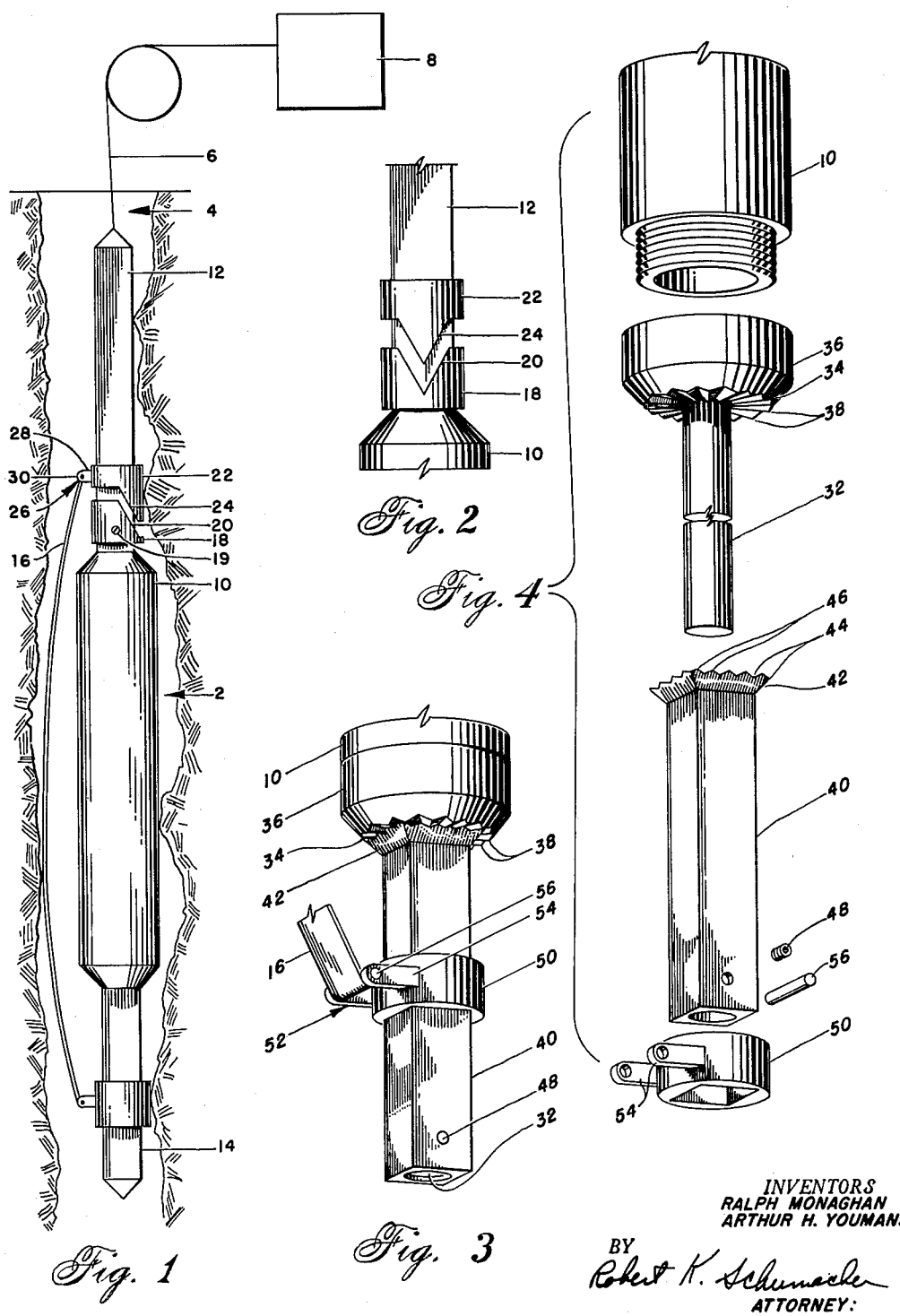
INVENTORS
RALPH MONAGHAN
ARTHUR H. YOUMANS
BY
Robert K. Schumacher
ATTORNEY:

United States Patent Office 2,994,770
Patented Aug. 1, 1961

2,994,770
DECENTRALIZING SPRING MOUNTING FOR WELL LOGGING INSTRUMENTS
Ralph Monaghan and Arthur H. Youmans, Tulsa, Okla., assignors to Well Surveys, Incorporated, a corporation of Delaware
Filed July 11, 1956, Ser. No. 597,136
2 Claims. (Cl. 250—83)

This invention relates to radioactivity well logging and particularly to an improved instrument for use in density logging.

Density logging is accomplished by lowering an instrument into the well to be logged, irradiating the formations surrounding the well with gamma rays, and measuring the gamma rays which are so scattered by the formations that they return to the well. However, since gamma rays are absorbed rather easily in dense materials, such as rocks, but travel readily through less dense materials, such as well fluids, density logs are influenced by various parameters, such as well diameter, presence and density of well fluids, displacement of the instrument from the wall of the well and the like. These are generally referred to as "borehole effect."

In order to overcome borehole effect, it has been common practice to provide a cylindrical instrument of uniform diameter having means for urging one side of the instrument against the wall of the well and to provide windows for the source and detector on that side of the instrument while shielding the rest of the instrument to reduce the amount of gamma rays passing through the well fluids without entering the formations and, thus, causing erroneous readings. Heretofore, the means for urging the instrument against the wall has consisted of a skid formed of a strip of resilient material, such as spring steel, which had one end thereof rigidly secured adjacent the lower end of the instrument while the other end of the skid was free to slide along the upper end of the instrument. However, this has not been entirely satisfactory.

When the wall of the well is uneven or irregular, the shape of the prior art instruments often caused the source and detector to be spaced a considerable distance away from the wall, thus greatly increasing the borehole effect. Moreover, when a restriction in the well diameter is encountered, as an instrument moves vertically in a well, the skid must retract laterally in order for the instrument to pass the restriction. For the skid to retract laterally, it must extend vertically. In the prior art, one end of the skid is free to permit this extension. With the arrangement of the prior art, movement of the instrument in the direction of the fixed end of the skid presented no problem. Restrictions in well diameter would urge the skid inwardly and away from the direction of motion. Since the trailing end of the skid was free to move, the skid could retract and pass the obstruction. However, if a restriction were encountered while moving in the opposite direction it would urge the skid toward its fixed end, which could not slide, and the skid would frequently become jammed. When this occurred, the skid would sometimes be bent or damaged so as to become useless and, in other instances, would cause the instrument to become stuck in the well causing the cable to break and resulting in expensive loss of operating time while the instrument was fished from the well, or actually resulting in loss of the instrument.

In addition, unless extreme care was exercised in assembling the instrument in its housing, the source and detector windows in the shielding would not be diametrically opposite the skid. Thus, when the instrument was urged against the wall of the well, the source and detector would still be spaced from the adjacent wall of the well and the borehole effect would still tend to obscure the log.

These disadvantages of prior art devices are overcome with the present invention and a well logging instrument is provided having a skid which is slidably secured to the instrument at each end and thus permits ready movement of the instrument within the well in either upward or downward direction while still urging the instrument against the wall of the well. Moreover, with the instrument of the present invention, it is possible always to be sure that the skid is diametrically opposite the source and detector windows. In addition, the present invention permits more intimate contact between the instrument and the wall in wells which have uneven or irregular walls.

The advantages of the present invention are preferably attained by providing a density logging instrument having reduced diameter portions adjacent the opposite ends thereof and having a skid which is readily retractable when restrictions are encountered during either raising or lowering operations and which is adjustable in position so as always to be diametrically opposite the source and detector windows.

Accordingly, it is an object of the present invention to provide a novel density logging instrument which permits intimate contact between the instrument and the wall of the well.

Another object of the present invention is to provide a novel density logging instrument having a skid which permits ready movement of the instrument within a well in both upward and downward directions while still urging the instrument against the wall of the well.

A further object of the present invention is to provide a novel density logging instrument having a skid which is adjustable in position so as always to be diametrically opposite the source and detector windows.

A specific object of the present invention is to provide a novel density logging instrument having reduced diameter portions adjacent the opposite ends thereof and having a skid which has both ends thereof slidably secured to the instrument so as to be readily retractable when restrictions are encountered during either raising or lowering operations and which is adjustable in position so as always to be diametrically opposite the source and detector windows.

These and other objects and features of the present invention will be apparent from the following description wherein reference is made to the figures of the accompanying drawings.

In the drawings:

FIG. 1 is a view, partly in section, showing a density logging instrument embodying the present invention suspended in a well;

FIG. 2 is a front elevation of the upper skid slider of the instrument of FIG. 1;

FIG. 3 is a perspective view of the lower skid slider of the instrument of FIG. 1; and FIG. 4 is an exploded view of the device of FIG. 3.

In that form of the invention chosen for purposes of illustration in the drawing, FIG. 1 shows a density logging instrument 2 suspended in a well 4 by means of a cable 6 which also serves to transmit signals from the instrument 2 to a recording device 8 located at the surface of the earth. The instrument 2 is preferably formed with a relatively thick central portion 10 and narrow end portions 12 and 14. The radioactive source, the detector and their associated shielding are housed in the central portion 10 while the electronic apparatus for processing the detector signal and applying it to the cable may be housed in the upper reduced diameter portion 12. It has been found in practice that, by forming the instrument 2 in this manner, the effective length of the instrument is substantially reduced and, where the wall of the well is uneven or irregular, the detector and source can frequently be brought into much closer proximity to the wall of the well than has been possible with previous instruments of uniform diameter. Consequently, the borehole effect is greatly reduced and the logs made with the instrument of the present invention are much more truly representative of the density characteristics of the formations surrounding the well than has been possible heretofore.

As seen in FIG. 1, the instrument 2 is provided with a skid 16 which engages one wall of the well 4 and urges the instrument 2 into contact with the opposite wall. In this connection, the narrow portions 12 and 14 of the instrument have an additional advantage in that they facilitate mounting of the skid 16 in a manner which greatly improves its utility. As illustrated in FIGS. 1 and 2, the upper portion 12 of the instrument 2 is smaller in diameter than the central portion 10. The portion 12 may have any desired cross-section. However, when electronic equipment is housed therein, the portion 12 is preferably round so as better to withstand the pressures encountered in a well. The portion 12 has a collar 18 fixedly secured about the lower end thereof, as by set screws 19. The collar 18 is formed with a large generally V-shaped seating slot 20 therein converging downwardly from the upper edge of the collar. Preferably, the outer diameter of the collar 18 will be less than the diameter of the central portion 10 of the instrument 2. Above the collar 18, a second collar or slider 22 is slidably mounted on the portion 12. The slider 22 is preferably formed with a generally V-shaped projection 24 which protrudes downwardly from the lower edge thereof and is adapted to mate with the seating slot 20. In addition, a coupling 26 is formed on the slider 22 and may comprise a pair of spaced lugs 28 with a pin 30 extending between the lugs. Again, the overall diameter of the slider 22, including lugs 28, should be less than the diameter of the central portion 10 of the instrument 2.

One end of the skid 16 is secured to pin 30 of the coupling 26. This connection is preferably hinged although it may be rigid, if desired. Thus, when the skid 16 strikes a restriction in the well diameter during descent in the well and is forced to contract, the lateral contraction may be translated into axial movement, causing slider 22 to slide upwardly along upper portion 12 of the instrument. When the restriction has been passed, skid 16 regains its original position and draws slider 22 downwardly. When the instrument is drawn up the well, projection 24 on collar 22 rides in slot 20 thereby assuring proper orientation of skid 16 with the source and detector windows of the instrument 2. This also prevents the skid 16 from sliding off the instrument.

The lower portion 14 of the instrument 2, as best seen in FIGS. 1, 3 and 4, comprises a circular projection 32 extending from the smaller surface 34 of a frusto-conical base 36. The diameter of surface 34 is greater than that of projection 32 and is less than the diameter of the central portion 10 of the instrument 2, while the greatest diameter of the base 36 is substantially equal to that of central portion 10 of the instrument 2. The base 36 may be secured to the lower end of the central portion 10 of the instrument 2 in any suitable manner as by a threaded coupling to permit disassembly of the instrument and is so arranged that projection 32 extends downwardly therefrom. Surface 34 of the base 36 is formed with a plurality of radially extending slots 38 which are spaced apart a predetermined number of degrees. A sleeve 40 having a square or polygonal outer surface encloses the projection 32 and is rotatable thereabout. The sleeve 40 is formed with a base 42 on the upper end thereof which has a surface 44 having a plurality of radially extending ridges 46 formed thereon which are matable with slots 38 on the base 36 to adjust the position of the sleeve 40. Preferably, the surface 44 will be provided with an odd number of ridges 46. Thus, minute adjustments may be made by rotating sleeve 40 through an angle of 90 degrees. Suitable means, such as set screw 48, is provided for securing the sleeve 40 in any position of adjustment. A slider 50 is mounted on the sleeve 40 in such a manner that it is free to slide axially of the sleeve 40 but cannot rotate about the sleeve, being keyed thereto by a mating inner surface. Moreover, the slider 50 is provided on one side thereof with a coupling 52 comprising a pair of spaced lugs 54 having a pin 56 extending between the lugs in substantially the same fashion as in coupling 26 described above. As with coupling 26, the overall diameter of coupling 52, including lugs 54 should not exceed the diameter of central portion 10 of the instrument 2. The lower end of the skid 16 is hingedly connected to the pin 56.

With this construction, the sleeve 40 may be adjusted about the projection 32 until the skid 16 is diametrically opposite the source and detector windows of the instrument 2. The sleeve 40 may be fixed in the adjusted position by tightening set screw 48, and thereafter the slider 50 is free to move axially along the sleeve 40 under the influence of the skid 16 in a manner similar to that described above with respect to the slider 22. However, since slider 50 cannot rotate about sleeve 40 and since slider 22 is guided by projection 24, the skid 16 will always be maintained diametrically opposite the source and detector windows, and consequently the windows will constantly be maintained as close as possible to the adjacent wall of the well.

With the skid 16 slidably mounted on the instrument 2 at each end, when the instrument 2 is being lowered in a well, slider 50 will bear against base 42 but slider 22 will be free to move to permit lateral retraction of skid 16 in the event that it encounters a restriction. Conversely, when the instrument 2 is being raised, slider 22 will be urged into seating engagement with collar 18 while slider 50 will be free to move. Thus, skid 16 can retract easily regardless of the direction of movement of the instrument 2 and the dangers of damaging the skid or jamming the instrument in the well are virtually eliminated.

Obviously, if desired, the assembly described for the upper end of the instrument could be interchanged with that described for the lower end. Moreover, it would be possible to use identical assemblies at both ends.

If desired, the collar 18 may be provided with a plurality of seating slots, similar to slot 20. Moreover, various means other than couplings 26 and 52 may be employed to couple the skid 16 to the instrument 2. Moreover, numerous other variations and modifications may, obviously, be made without departing from the invention. Accordingly, it should be clearly understood that those forms of the invention described above and shown in the figures of the accompanying drawings are illustrative only and are not intended to limit the scope of the invention.

What we claim is:

1. A subsurface instrument for nuclear well logging comprising a directionally sensitive radiation detector, a resilient skid for urging said detector toward a wall of a well being logged, means slidably securing said skid to respective portions of said instrument above and below said detector for movement axially of said instrument, and rotational indexing means for securing said slidably securing means in such rotational position about said instrument that said skid is so disposed with respect to the sensitive direction of said detector that the detector is always urged in said direction.

2. A subsurface instrument for radioactivity well logging comprising a housing having a central portion and upper and lower portions extending from said central portion, a skid for urging said instrument toward a wall of a well to be logged, a collar fixedly secured to said upper portion of said housing and slotted in the upper edge thereof, a first slider encircling said upper portion above said collar and projecting on the lower side thereof mating with said slotted collar, said first slider being slidable axially of said upper portion, means coupling the upper end of said skid to said first slider, said lower portion of said housing having a base secured to said central portion and a cylindrical projection of lesser diameter than said base projecting downwardly from the lower face of said base, a sleeve surrounding said cylindrical projection and rotatable thereabout, cooperating indexing means on said sleeve and said base for adjusting the position of said sleeve about said cylindrical projection, means for securing said sleeve in a desired position of adjustment, a second slider encircling said sleeve and movable only axially of said sleeve, and means securing the lower end of said skid to said second slider.

References Cited in the file of this patent

UNITED STATES PATENTS

| | | |
|---|---|---|
| 1,170,335 | Ridson | Feb. 1, 1916 |
| 1,440,778 | Foster | Jan. 2, 1923 |
| 1,487,863 | Lavigne | Mar. 25, 1924 |
| 1,930,987 | Simmons | Oct. 17, 1933 |
| 2,669,690 | Doll | Feb. 16, 1954 |
| 2,711,482 | Goodman | June 21, 1955 |
| 2,769,914 | Goodman | Nov. 6, 1956 |
| 2,769,918 | Tittle | Nov. 6, 1956 |
| 2,852,696 | Johnson | Sept. 16, 1958 |
| 2,875,347 | Anderson et al. | Feb. 24, 1959 |
| 2,882,417 | Johnson | Apr. 14, 1959 |